G. HAND.
Cooking-Vessel.
No. 214,908. Patented April 29, 1879.
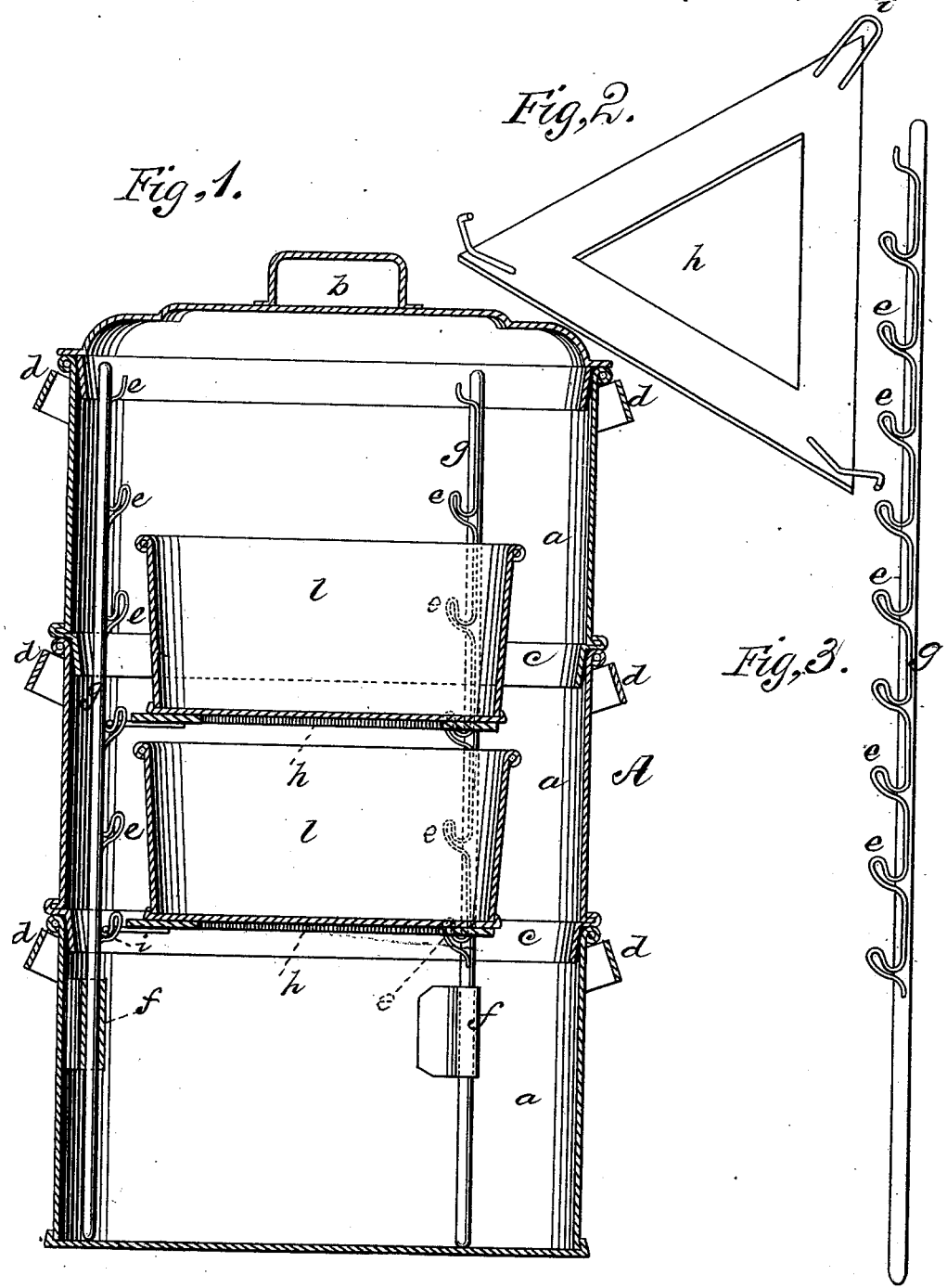
WITNESSES
Villette Anderson
F. J. Masi.
INVENTOR
George Hand
by E. W. Anderson.
ATTORNEY

UNITED STATES PATENT OFFICE.

GEORGE HAND, OF HATBOROUGH, PENNSYLVANIA.

IMPROVEMENT IN COOKING-VESSELS.

Specification forming part of Letters Patent No. 214,908, dated April 29, 1879; application filed February 24, 1879.

*To all whom it may concern:*

Be it known that I, GEORGE HAND, of Hatborough, in the county of Montgomery and State of Pennsylvania, have invented a new and valuable Improvement in Cooking-Vessels; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical central section of my improved cooking-vessel. Fig. 2 is a view of the rest or platform, and Fig. 3 is a detached view of the hook-rod.

The nature of the invention consists in a culinary vessel composed of a lower section with a tight bottom, one or more annular sections removably secured thereto, the upper section being closed by a lid, the independent removable rods provided with hooks regularly spaced, platforms or rests engaged with said hooks, and vessels placed on said rests and designed to contain various articles of food, as hereinafter more fully shown and described.

In the annexed drawings, the letter A designates a metallic cylinder or culinary vessel, made up of two or more detachable sections, $a$. The lower section has a tight bottom, those above being simple rings, and the upper section being closed by a removable lid, $b$. Each section is joined to the one below by a tight rim, $c$, and is provided with handles $d$, by means of which it may be readily separated therefrom, and instead of a removable lid the top section may have a tight top.

On the inside of the bottom section, far enough from its top to clear the rim of the section next above, are the tubes $f$, usually three in number, and secured to the walls of the said lower section, which receive and hold each a removable metallic rod, $g$. These extend from the bottom nearly to the top of the cylinder, and, above the tubes which hold them, are provided with hooks $e$ at short, regular intervals. Upon said hooks are applied, by means of loops $i$ or their equivalents, any convenient number of open-work rests or platforms $h$, so adjusted as to be readily placed or displaced. Upon these rests are placed vessels $l$, of various sizes, in which are placed the provisions to be cooked.

This device is used by partly filling the lower section with water and placing in it any article to be cooked, and then placing in the vessels on the rests such other articles as may be desired, the number of such vessels being only limited by the capacity of the cylinder.

In this way a meal consisting of a variety of dishes may be excellently cooked by one small fire and with but little trouble or attention.

I am aware that it is not new to arrange a series of communicating vessels one over the other in a steam-cooking apparatus, and it is old to place a rack inside of a steam-cooking vessel to receive inner pans, and I do not claim such devices.

What I claim as new, and desire to secure by Letters Patent, is—

The culinary vessel composed of two or more detachable sections, the lower section having a tight bottom, and the upper section having a tight top or removable lid, the independent removable rods $g$, stepped in the lower section, reaching nearly to the top of the upper section, and provided with hooks at intervals, the rests or platforms supported by said hooks, and adjustable up or down, and the vessels resting upon said platforms, the whole constructed and arranged to operate as specified.

In testimony that I claim the above I have hereunto subscribed my name in the presence of two witnesses.

GEORGE HAND.

Witnesses:
   E. L. PERDRIAUX,
   ALLEN H. GANGEWER.